July 29, 1924.

L. J. SLADEK

INFLATING NOZZLE AND TIRE GAUGE

Filed March 4, 1920

1,503,068

Patented July 29, 1924.

1,503,068

UNITED STATES PATENT OFFICE.

LOUIS J. SLADEK, OF SYCAMORE, ILLINOIS.

INFLATING NOZZLE AND TIRE GAUGE.

Application filed March 4, 1920. Serial No. 363,177.

*To all whom it may concern:*

Be it known that I, LOUIS J. SLADEK, a citizen of the United States, and resident of Sycamore, in the county of De Kalb and State of Illinois, have invented certain new and useful Improvements in an Inflating Nozzle and Tire Gauge, of which the following is a specification.

My invention relates to devices for use in inflating tires and ascertaining the pressure of air therein.

One of the objects of the invention is to provide a device which combines the functions of the two elements mentioned in the title and in which the gauge may be operated independently of the function of the device as an inflating nozzle. I am aware that it is common to combine a pressure gauge with an inflating nozzle but my device is so constructed that the gauge may be used to show the pressure in the tire without at the same time admitting pressure to the tire from the source of supply. The pressure maintained in the lines at public inflating stations is usually high relative to the pressure desired in the tire and where the gauge is in effect mounted in the line, it registers the pressure in the line rather than the pressure in the tire, this for the reason that the air enters through the tire valve relatively slowly and the gauge cannot indicate the pressure conditions within the tire. In my device the gauge is in communication with a chamber provided between the admission valve for the air under pressure and the tire valve and therefore the nozzle may be engaged with the tire valve and the pressure indicated on the gauge. Thereafter if the pressure is insufficient the admission valve may be opened by additional movement and air admitted.

Figure 1:
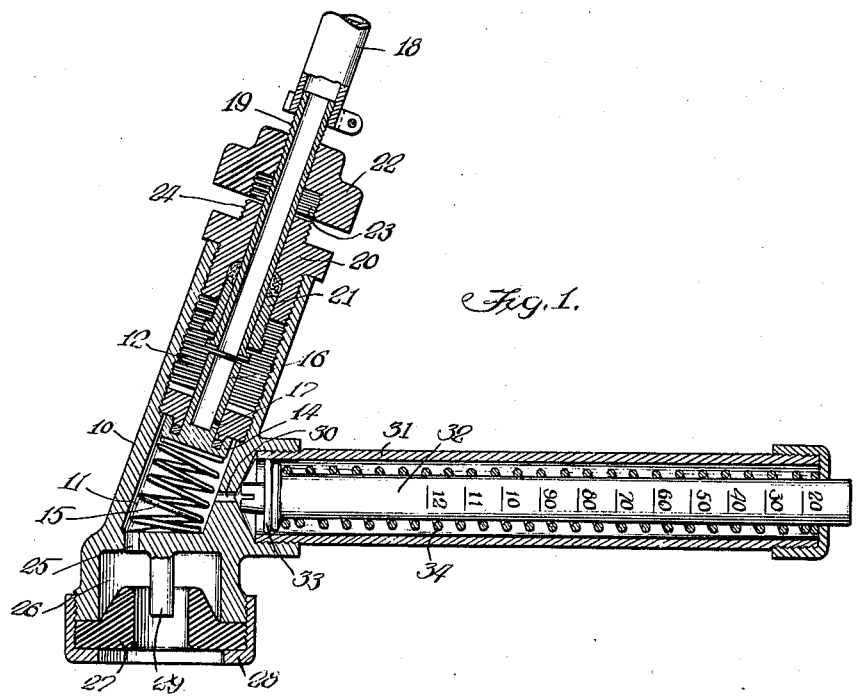
Figure 2:
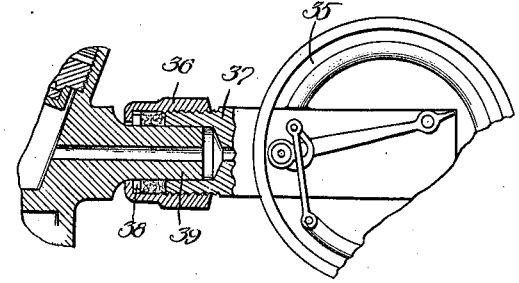

The invention may be more readily understood by reference to the accompanying drawing, wherein, Fig. 1 is a sectional view through a device constructed in accordance with my invention, and, Fig. 2 illustrates a slight modification in the form of the pressure indicating device.

In the drawings it will be seen that I provide a casing 10, having chambers 11, 12, which are divided by a wall formed of a peripherally threaded disk 13. The interior of the chamber 12, is threaded and the disk is moved to the position shown in the drawing by the usual engagement of the threads. The disk is centrally apertured and on its lower face is provided with a seat adapted to be engaged by a valve 14, held to its seat by a relatively stiff expansion spring 15. The valve is provided with a hollow stem 16, the side wall of the stem near its lower end being apertured as at 17. Air is admitted through a suitable hose or other connection 18, the hose being secured to the projecting end of a plunger 19, the outer end of which is threaded and the remainder thereof smooth. The plunger is mounted within a plug 20, screwed into the otherwise open end of the casing and a stuffing box 21, serves to prevent possible leakage of air around the plunger. A nut 22, has engagement with the threaded end of the plunger and normally serves as a hand grip or convenient means for effecting longitudinal movement of the plunger to unseat the valve 14. If it be desired to retain the valve in open position the nut may be rotated to cause engagement of a threaded recess 23 therein, with a threaded boss 24 on the end of the plug 20. The chamber 11, within which the spring 15 is seated, is provided with an aperture 25, which places it in open communication with a chamber 26, the lower end of which is partially closed by a rubber washer 27, held in place by a flanged nut 28. A central plunger 29, effects the opening of a tire valve in the usual manner.

Another aperture 30 places the chamber in open communication with a pressure gauge of which any of several types may be employed. In the construction of Fig. 1 I employ a gauge consisting of a tube 31, within which a plunger 32 is mounted, the plunger having suitable figures thereon indicating pressures. The outward movement of the plunger which carries a piston 33, at its lower end is resisted by a spring 34 in the usual manner.

In the construction shown in Fig. 2, the gauge 35 is of a slightly different type and because of the construction indicated it is desirable to mount the gauge for rotary movement. This is effected by means of a packing nut 36, which engages the threaded end 37 of the gauge, the flange lying behind a ring 38, suitably fixed to the projecting nipple 39, from the main casing.

In operation the pressure within a tire may be ascertained by applying the nozzle in the usual manner, thus serving to open the valve and admitting air to the chamber 11 and through the aperture 30 to the gauge. If the pressure is insufficient, additional air may be admitted by moving the plunger 16 downward, thus opening the valve 14. When operated in this manner the device is valuable for general use, may be cheaply constructed and is not liable to get out of order.

Modifications in the construction shown may be made without departure from the spirit of my invention.

I claim:

1. In a hose connection for a tire valve, a casing adapted to be connected to a tire valve, a hollow plunger adapted to have its outer end secured to an air supply hose, and a spring resisted valve operable by the plunger whereby upon movement of the plunger relatively to the casing air is admitted to the casing and may pass to the tire valve, the valve adapted to be closed without unfastening the hose.

2. In a hose connection for a tire valve, a casing having a chamber, means carried by the casing for removably mounting the connection on a tire valve, an air supply plunger adapted for substantially permanent connection to an air supply hose, a valve controlling the entrance of the air under pressure to said chamber, and adapted to be operated by said plunger, and a spring for normally holding the valve seated and resisting the opening of the valve by the plunger.

3. In a hose connection for a tire valve, a casing having at one end means for engagement with an inflating valve, the casing having a chamber, a wall dividing the chamber, a plunger adapted to be secured to a supply hose, a valve having engagement with a seat on said wall, the parts arranged whereby inward movement of the plunger serves to uncover said seat and admit air to the chamber beneath the wall, substantially as described.

4. In a device of the class described, the combination of a casing having a chamber and means for engaging the casing with an inflating valve, a wall dividing said chamber into upper and lower compartments the lower compartment adapted to be placed in communication with an inflating valve, a valve having a seat on said wall, a longitudinally reciprocable plunger adapted to be secured to a supply hose, and means in said upper compartment for packing said plunger, the movement of said plunger serving to unseat said valve and admit air into the lower compartment, substantially as described.

5. In a device of the class described, the combination of a casing having a tubular chamber, a wall dividing said chamber into upper and lower compartments, a threaded plug closing the upper end of said casing, a freely reciprocable plunger mounted in said plug, said plunger being hollow and being adapted to be secured to a supply hose, means for packing said plunger in the plug, a valve having a seat on said wall, a spring normally holding said valve on its seat, and means secured to the casing and adapted to engage an inflating valve to admit pressure from a tire into said lower compartment without admitting air from said supply hose, substantially as described.

6. In a device of the class described, the combination of a casing having a chamber, a valve mounted in the chamber, a plunger adapted to reciprocate said valve and arranged to be secured to a supply hose, a spring for holding said valve to its seat, a nut mounted on said plunger, and means secured to the casing for engaging said nut whereby the plunger may be depressed to open the valve and hold the valve in open position, substantially as described.

7. A connection for use in inflating tires including in combination, a hollow casing having parts at one end adapting it to be removably secured to a tire valve tube, a spring pressed, normally closed, inwardly opening valve between its ends, the valve carried on a tubular stem mounted for longitudinal movement thru the opposite end of the casing, the outer end of the tube adapted to have an air pressure hose secured thereto, the valve being adapted to be opened by pushing inwardly on the tube and to be closed by pulling outwardly on the tube.

8. A connection for use in inflating tires including in combination, a hollow casing having parts at one end adapting it to be removably secured to a tire valve tube, a spring pressed, normally closed, inwardly opening valve between its ends, the valve carried on a tubular stem mounted for longitudinal movement thru the opposite end of the casing, the outer end of the tube adapted to have an air pressure hose secured thereto, and means carried by the tube for engagement with the outer end of the connection for holding the valve open against the spring.

Signed at Sycamore, Ill., this 28th day of February, 1920.

LOUIS J. SLADEK.

Witness:
HENRY G. ANDERSON.